(12) United States Patent
Krauss

(10) Patent No.: US 11,945,300 B2
(45) Date of Patent: Apr. 2, 2024

(54) CHARGING OR FUELING RECESS AND METHOD FOR THE PRODUCTION THEREOF

(71) Applicant: ILLINOIS TOOL WORKS INC., Glenview, IL (US)

(72) Inventor: Werner Krauss, Creglingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 649 days.

(21) Appl. No.: 16/922,117

(22) Filed: Jul. 7, 2020

(65) Prior Publication Data

US 2021/0016658 A1    Jan. 21, 2021

(30) Foreign Application Priority Data

Jul. 15, 2019 (DE) ...................... 10 2019 119 091.6

(51) Int. Cl.
| | |
|---|---|
| *B60K 15/05* | (2006.01) |
| *B29C 45/16* | (2006.01) |
| *B60K 15/04* | (2006.01) |
| *F16J 15/10* | (2006.01) |
| *B29L 31/56* | (2006.01) |
| *B60K 15/03* | (2006.01) |

(52) U.S. Cl.
CPC .......... *B60K 15/05* (2013.01); *B29C 45/1676* (2013.01); *F16J 15/102* (2013.01); *B29L 2031/565* (2013.01); *B60K 2015/03493* (2013.01); *B60K 2015/047* (2013.01); *B60K 2015/053* (2013.01)

(58) Field of Classification Search
CPC .......... B60K 15/05; B60K 2015/03493; B60K 2015/047; B60K 2015/053
USPC ....................................................... 220/86.2
See application file for complete search history.

(56) References Cited

U.S. PATENT DOCUMENTS

| | | | |
|---|---|---|---|
| 9,688,136 B2 | 6/2017 | Roth | |
| 2009/0189410 A1* | 7/2009 | Gurtatowski | B60K 15/05 |
| | | | 296/97.22 |
| 2014/0060920 A1 | 3/2014 | Tamaoki | |
| 2015/0274010 A1 | 10/2015 | Roth | |
| 2018/0145442 A1 | 5/2018 | Sanchez | |

FOREIGN PATENT DOCUMENTS

| | | | | |
|---|---|---|---|---|
| CN | 110254523 A | * | 9/2019 | ............. B60K 15/05 |
| DE | 10 2006 015 417 | | 10/2007 | |
| DE | 102006015417 A1 | * | 10/2007 | ............. B60K 15/05 |

(Continued)

*Primary Examiner* — J. Gregory Pickett
*Assistant Examiner* — Niki M Eloshway
(74) *Attorney, Agent, or Firm* — THOMPSON HINE LLP

(57) ABSTRACT

A charging or fueling recess for use in a body opening of a vehicle, which has a recess body and a hinge housing as a rigid part made of a first plastic, wherein the recess body is formed integrally with the hinge housing, wherein the hinge housing has a lower part and an upper part, wherein the charging or fueling recess also has a hinge housing sealing body as a flexible part made of a second plastic which is softer than the first plastic, wherein the hinge housing sealing body is arranged at least sectionally between the lower part and the upper part, wherein the recess body, the hinge housing and the hinge housing sealing body are produced using a two-component injection-molding process.

8 Claims, 4 Drawing Sheets

(56) References Cited

FOREIGN PATENT DOCUMENTS

| | | | | |
|---|---|---|---|---|
| DE | 102012025372 A1 | * | 7/2014 | ............ B60K 15/05 |
| DE | 10 2014 104 501 | | 10/2015 | |
| DE | 102018221809 A1 | * | 6/2019 | ............ B60K 15/05 |
| EP | 3375653 A1 | * | 9/2018 | ............ B60K 15/04 |
| FR | 2836427 | | 8/2003 | |
| FR | 2931400 A1 | * | 11/2009 | ............ B60K 15/05 |
| JP | H 08296630 | | 11/1996 | |
| WO | WO-2012161087 A1 | * | 11/2012 | ............ B60K 15/05 |

* cited by examiner

CHARGING OR FUELING RECESS AND METHOD FOR THE PRODUCTION THEREOF

TECHNICAL FIELD

The invention relates to a charging or fueling recess for use in a body opening of a vehicle, and to a method for producing a corresponding charging or fueling recess.

BACKGROUND

Fueling or charging recesses for fueling a vehicle (for example a motor vehicle) with fuel or, for example, a urea solution (Ad-Blue), or for charging the battery of an electric or hybrid motor vehicle, respectively, are inserted, for example snap-fitted, in a body opening of the vehicle. Moreover, fueling or charging recesses of this type have a through-opening into which a tank filler pipe that leads to the tank of the motor vehicle, or a charging plug connector that is connected to the battery of the motor vehicle, respectively, can be inserted. The interface (the transition) between the fueling or charging recess and the body opening and also the interface between the fueling or charging recess and the tank filler pipe are usually sealed.

Moreover, fueling or charging recesses of this type have a hinge housing into which a hinge arm, or the axle thereof, respectively, can be inserted. The hinge arm supports a fueling or charging flap which is connected to the recess body so as to be pivotable between an opening position which exposes the charging or fueling recess and a closing position which closes the charging or fueling recess.

The hinge housing is usually composed of two separate parts, a lower part and an upper part, which are snap-fitted to one another.

In the known hinge housing there is however an issue in that said known hinge housings, depending on the field of application, are not sufficiently tight, moisture and contamination thus being able to invade the hinge housing.

Furthermore, the currently known hinge housings by way of the design thereof are complex to produce and not sufficiently stable in terms of the construction thereof.

SUMMARY

It is therefore an object of the invention to specify a fueling or charging recess for use in a body opening of a vehicle which eliminates the above-mentioned issues and disadvantages of the prior art. It is in particular an object of the present invention to specify a fueling or charging recess which is particularly tight, particularly stable, and simple to produce.

The solution according to the invention lies in configuring a charging or fueling recess for use in a body opening of a vehicle which has a recess body and a hinge housing as a rigid part made of a first plastic, wherein the recess body is formed integrally with the hinge housing, wherein the hinge housing has a lower part and an upper part, wherein the charging or fueling recess also has a hinge housing sealing body as a flexible part made of a second plastic which is softer than the first plastic, wherein the hinge housing sealing body is arranged at least sectionally between the lower part and the upper part, wherein the recess body, the hinge housing and the hinge housing sealing body are produced using a two-component injection-molding process.

The object is satisfactorily achieved by way of the charging or fueling recess according to the invention.

On account of the recess body and the hinge housing as a rigid part being produced from a first plastic and the hinge housing sealing body being produced from the second softer plastic in a two-component injection-molding process, a hinge housing which has a very high degree of tightness can in particular be produced. Since the recess body is formed integrally with the hinge housing, the charging or fueling recess has a high degree of stability and is simple to produce.

In order for particularly reliable sealing to be ensured, the hinge housing sealing body is preferably completely formed (that is to say in an encircling manner) on an outer edge between the lower part and the upper part.

The hinge housing fundamentally serves for receiving a hinge arm, or an axle thereof, respectively, wherein the hinge arm supports a fueling or charging flap.

According to the invention, this may be a fueling recess for filling a fuel, in particular a diesel or gasoline fuel or a liquid gas, into a tank of the vehicle. Moreover, this can furthermore also be a fueling recess for filling, for example, a urea solution (Ad-Blue) into a tank of a motor vehicle.

For filling, a tank filler pipe is in principle inserted into the fueling recess. The tank filler pipe has a filling opening through which the fuel or, for example, the urea solution, can be guided into the tank of the (motor) vehicle. To this end, the tank filler pipe is connected to the tank. The tank filler pipe can have a circular-cylindrical cross section, for example.

However, according to the invention this may also be a charging recess for charging electric batteries of a motor vehicle. In this case, a charging plug connector to which a corresponding charging plug connector for charging the electric batteries can be connected is inserted into the charging recess. The charging plug connector is connected to the electric batteries of the motor vehicle. The charging plug connector in turn can in particular have a circular-cylindrical cross section. To the extent that mention is made of a charging plug connector in this context, this may refer not only to an electric charging plug as well as to an electric charging socket.

According to one advantageous refinement of the invention, the lower part and the upper part of the hinge housing are connected on one side by means of an integral hinge.

The hinge housing is thus not in multiple parts, but can be formed from one contiguous part. This means that the lower part and the upper part can be conjointly produced in one injection-molding step. The associated advantages will become particularly evident in the context of the associated production method.

According to one advantageous refinement of the invention, the lower part of the hinge housing is connected by means of a web to the recess body, the integral hinge being arranged on a side of the lower part opposite the web.

The lower part is connected in a stable manner to the recess body by way of the web. Furthermore, this configuration of the charging or fueling recess in the case of swung-open hinge housing permits the recess body, the lower part, and the upper part to lie alongside one another so as to be at least substantially in one plane and therefore to be able to be injection-molded in this arrangement in a corresponding mold.

According to one advantageous refinement of the invention, the charging or fueling recess also has a first sealing body which is arranged in a through-opening of the recess body and is made of the second plastic.

The first sealing body is formed on an inner opening of the recess body in which a through-opening of the recess body which (by means of a tank filler pipe or a charging plug connector, respectively) enables a connection to the tank, or to the battery, respectively, is also arranged. The first sealing body is preferably over-molded here so as to be continuous on an edge of the opening.

The interface (the transition) between the fueling or charging recess and a tank filler pipe, or a charging plug connector, respectively, can thus be reliably sealed by means of the first sealing body.

As has already been described, the tank filler pipe usually has a circular-cylindrical cross section. In a corresponding manner, the first sealing body can preferably have a shape which is at least substantially annular.

Of course, it is however also conceivable that the first sealing body is not formed so as to be annular. The design embodiment of the sealing body herein depends in particular on the tank filler pipe, or the charging plug connector, respectively.

According to one advantageous refinement of the invention, the charging or fueling recess also has a second sealing body which is arranged at least substantially on an outer edge of the recess body and is made of the second plastic.

The second annular sealing body herein serves for sealing the interface between the fueling or charging recess and the body opening.

In a corresponding manner, the shape of the second sealing body here in particular depends on the body opening (and of course on the external dimensions (outer edge) of the recess body). A typical shape is thus a sealing body which is at least substantially annular, or a sealing body which is at least substantially oval.

According to one advantageous refinement of the invention, the recess body, the hinge housing, the hinge housing sealing body and the first sealing body and/or the second sealing body are produced using a two-component injection-molding process.

Depending on whether a first sealing body and/or a second sealing body is provided, this means that said first sealing body and/or said second sealing body are/is also produced using the two-component injection-molding process.

The recess body and the hinge housing herein are produced as a rigid part, that is to say from the first (rigid or more rigid) plastic, and the hinge housing sealing body and the first sealing body and/or the second sealing body as a flexible part are conjointly produced from the second plastic.

According to one advantageous refinement of the invention, the charging or fueling recess also has an annular supporting member which is arranged in the through-opening of the recess body and around which the first (preferably substantially annular) sealing body is injection-molded.

The supporting member herein can also serve for fastening the charging or fueling recess to the tank filler pipe, or to the charging plug connector, respectively.

Since the tank filler pipe usually has a circular-cylindrical cross section, the supporting member preferably has an at least substantially annular shape.

Of course, it is also conceivable that the shape of the supporting element is differently formed. The design embodiment of the supporting member herein depends in particular on the tank filler pipe, or the charging plug connector, respectively.

The annular supporting member is preferably likewise produced from the first plastic and particularly preferably is produced simultaneously (in the same injection-molding step) with the recess body (and the hinge housing).

According to one advantageous refinement of the invention, the charging or fueling recess also has a hinge arm connected pivotably to the hinge housing, said hinge arm being connected or connectable to a fueling or charging flap.

The fueling or charging flap in this instance is pivotable between an opening position which exposes the charging or fueling recess and a closing position which closes the charging or fueling recess.

The solution according to the invention furthermore lies in specifying a method for producing a charging or fueling recess by means of two-component injection-molding, which comprises the following steps: a rigid part injection-molding step during which at least one recess body and a hinge housing exhibiting an upper part and a lower part are made (that is to say injection-molded) of a first plastic; and a flexible part injection-molding step during which at least one hinge housing sealing body is formed from a second plastic, wherein the hinge housing sealing body is arranged at least sectionally between the lower part and the upper part.

The rigid part injection-molding step herein can take place in a first cavity, and the flexible part injection-molding step can take place in a second cavity.

According to one advantageous refinement of the invention, during the rigid part injection-molding step the recess body, the upper part, and the lower part of the hinge housing lie alongside one another.

This means that the recess body, the upper part, and the lower part in this step lie alongside one another so as to be at least substantially in one plane in the same cavity, and thus can be molded in one step.

According to one advantageous refinement of the invention, a transfer step is carried out between the rigid part injection-molding step and the flexible part injection-molding step, in which at least the upper part of the hinge housing is placed on the lower part of the hinge housing.

The rigid part molded during the transfer step is preferably removed from the cavity thereof (rigid part cavity) and placed into another cavity (flexible part cavity) so as to enable the flexible part injection-molding step. The upper part of the hinge housing can then also be placed on the lower part of the hinge housing during said transfer.

Subsequently, the outer edge between the upper part of the hinge housing and the lower part of the hinge housing is over-molded with the hinge housing sealing body in the flexible part injection-molding step.

According to one advantageous refinement of the invention, during the transfer step the upper part is turned about an integral hinge formed between the upper part and the lower part in the rigid part injection-molding step.

By configuring the integral hinge between the upper part and the lower part in the rigid part injection-molding step it is possible that the rigid part composed of the recess body, the upper part, and the lower part can be formed as a contiguous (integrally formed) rigid part. It is therefore no longer necessary for a multiple-part hinge housing to be used.

In this context, it would be conceivable that the upper part and/or the lower part have corresponding latching devices such that the upper part can be latched, or snap-fitted, respectively, in the lower part, or vice versa According to one advantageous refinement of the invention, during the flexible part injection-molding step, a first sealing body is also formed in a through-opening of the recess body.

This means that said first sealing body is likewise formed from the second plastic and is formed in the same flexible part injection-molding step such that a total of only two injection-molding steps are necessary.

According to one advantageous refinement of the invention, during the flexible part injection-molding step, a second sealing body is also formed on an outer edge of the recess body.

Three different flexible parts as sealing bodies can thus be molded on the hard part during one and the same injection-molding step.

According to one advantageous refinement of the invention, during the rigid part injection-molding step, a supporting member is also formed in a, or the, through-opening in the recess body and the first sealing body is preferably injection-molded around it during the flexible part injection-molding step.

The number of injection-molding procedures is also not increased on account thereof since the supporting member as a rigid part is likewise produced from the first plastic material.

The invention will be explained in more detail hereunder by means of the description of exemplary embodiments with reference to the appended drawings.

DETAILED DESCRIPTION

Figure 1:
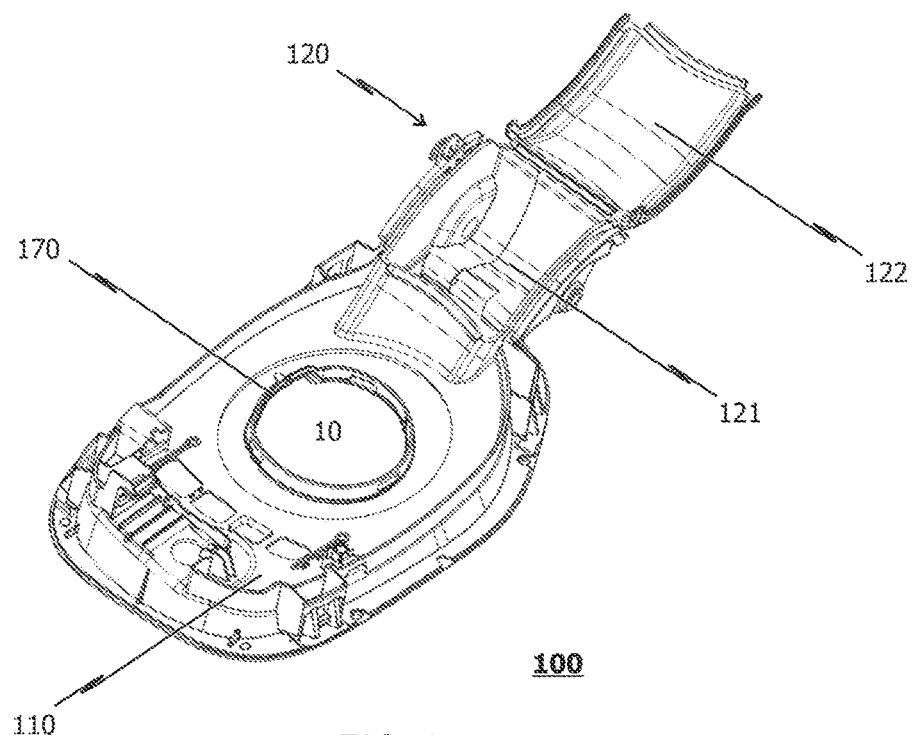
FIG. 1 shows an isometric view of a rigid part of a charging or fueling recess according to the present invention.
Figure 2:
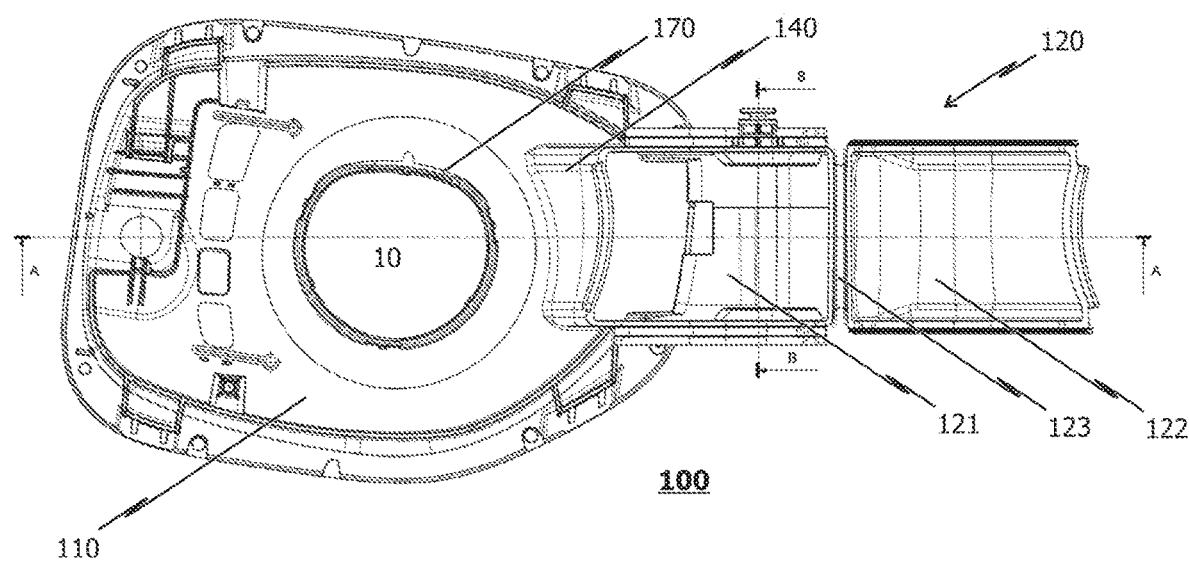
FIG. 2 shows a plan view of the rigid part of the charging or fueling recess according to FIG. 1.
Figure 3:
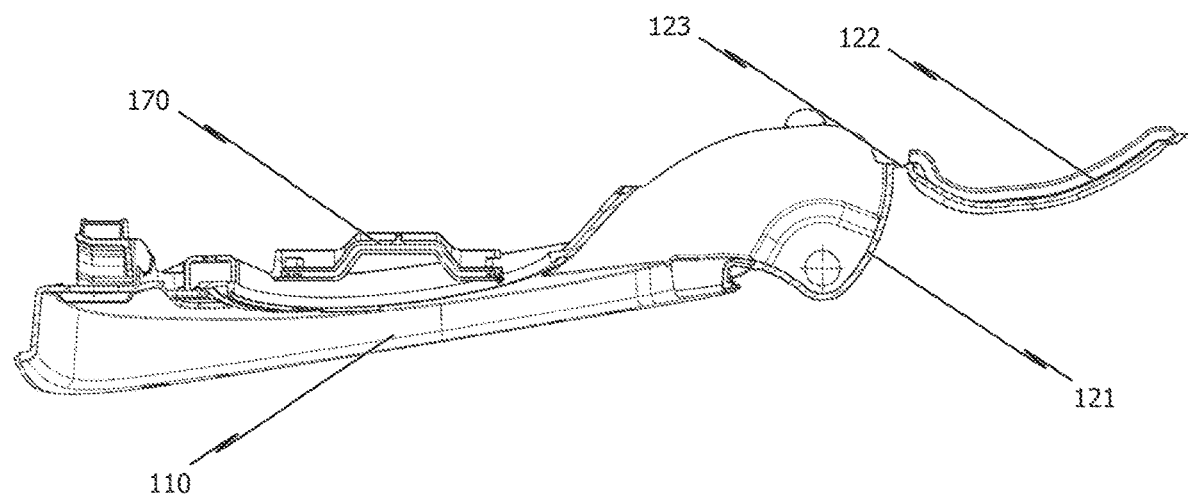
FIG. 3 shows a cross-sectional view along the line A-A in FIG. 2.
Figure 4:
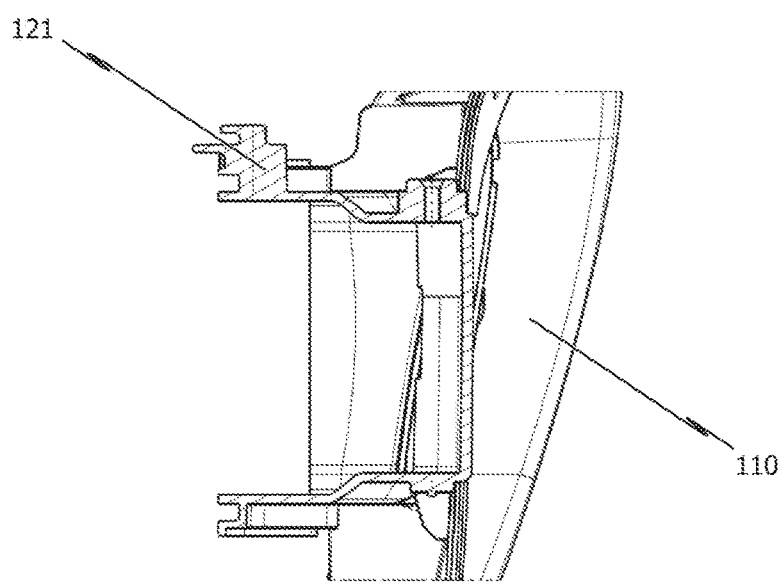
FIG. 4 shows a cross-sectional view along the line B-B in FIG. 2.
Figure 5:
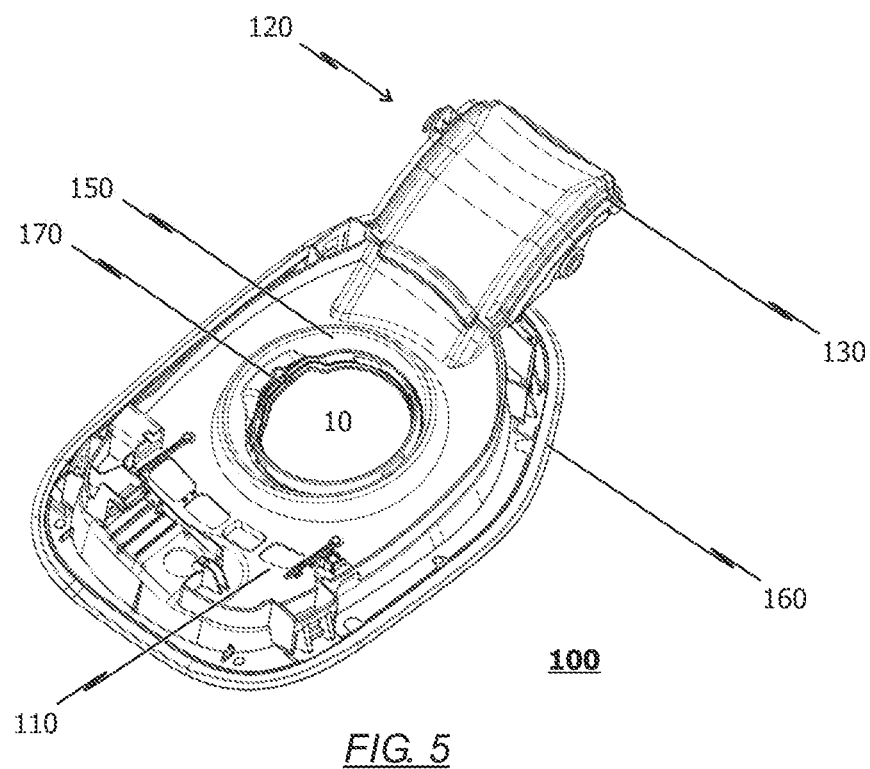
FIG. 5 shows an isometric illustration of the rigid part and the flexible part of the charging or fueling recess according to the present invention.
Figure 6:
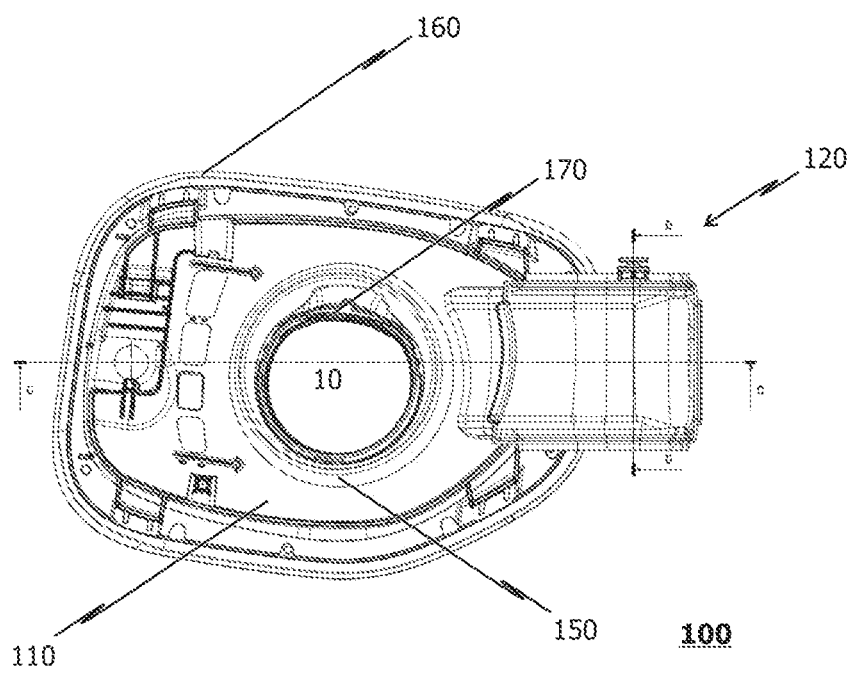
FIG. 6 shows a plan view of the charging or fueling recess according to FIG. 5.

Reference hereunder is initially made to FIGS. 1 to 4 which show illustrations of a charging or fueling recess 100, more specifically the rigid part of the charging or fueling recess 100 that is made of a first plastic.

The rigid part of the charging or fueling recess has a recess body 110, a hinge housing 120, and preferably a supporting member 170.

The recess body 110 can have latching installations by way of which said recess body 110 can be snap-fitted in a body opening, for example.

The hinge housing 120 has a lower part 121 and an upper part 122, wherein the lower part 121 and the upper part 122 are connected to one another by means of an integral hinge 123. The hinge housing 120 per se is connected to the recess body 110 by means of web 140. The recess body 110, the lower part 121, the integral hinge 123, and the upper part 122 are thus formed so as to be mutually integral.

FIGS. 1 to 4 show the hinge housing 120 in swung-open state, that is to say that the upper part 122 lies alongside the lower part 121.

The supporting member 170 is arranged in an opening in the recess body 110, wherein a through-opening 10 for inserting a tank filler pipe, for example, is later arranged in said opening. The supporting member 170 and the recess body 110 are not configured so as to be mutually integral.

As can likewise be seen in FIGS. 1 to 4, the hinge housing 120 has a receptacle for the axle of a hinge arm which is connectable or connected to a fueling or charging flap.

All of the components (rigid parts) shown in FIGS. 1 to 4 are formed from the first plastic by means of a common rigid part injection-molding step. In particular, FIGS. 1 to 4 thus show the result of the rigid part injection-molding step. The individual elements herein are formed in a corresponding cavity, as is also illustrated in FIGS. 1 to 4.

Reference hereunder is made to FIGS. 5 to 8 which show views of the rigid part and of the flexible part of the charging or fueling recess 100 according to the present invention.

In particular, FIGS. 5 to 8 show the charging or fueling recess 100 after a flexible part injection-molding step in which the rigid parts shown in FIGS. 1 to 4 have been over-molded by means of the second plastic.

Figure 7:
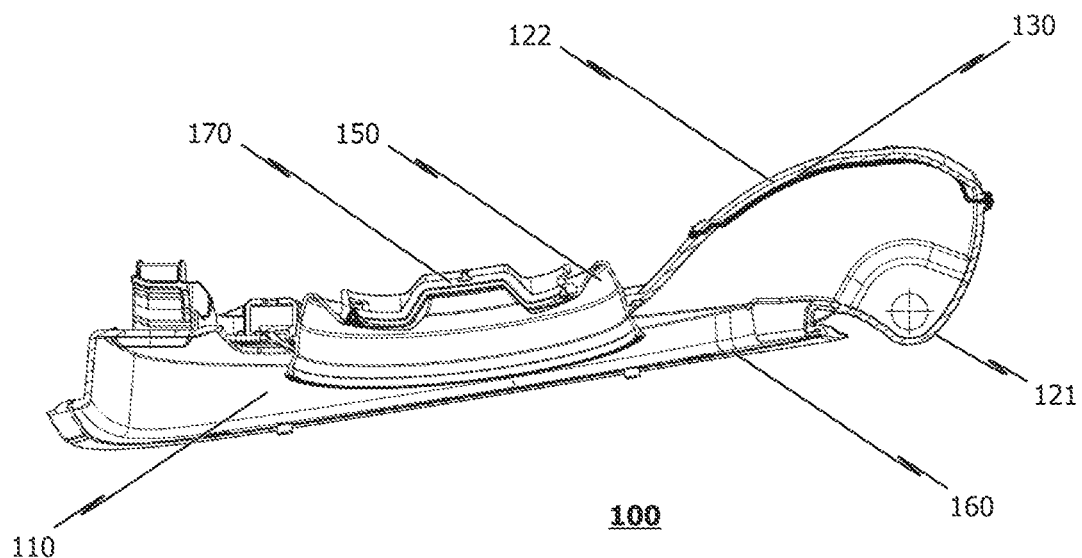
FIG. 7 shows a cross-sectional view along the line C-C in FIG. 6.
Figure 8:
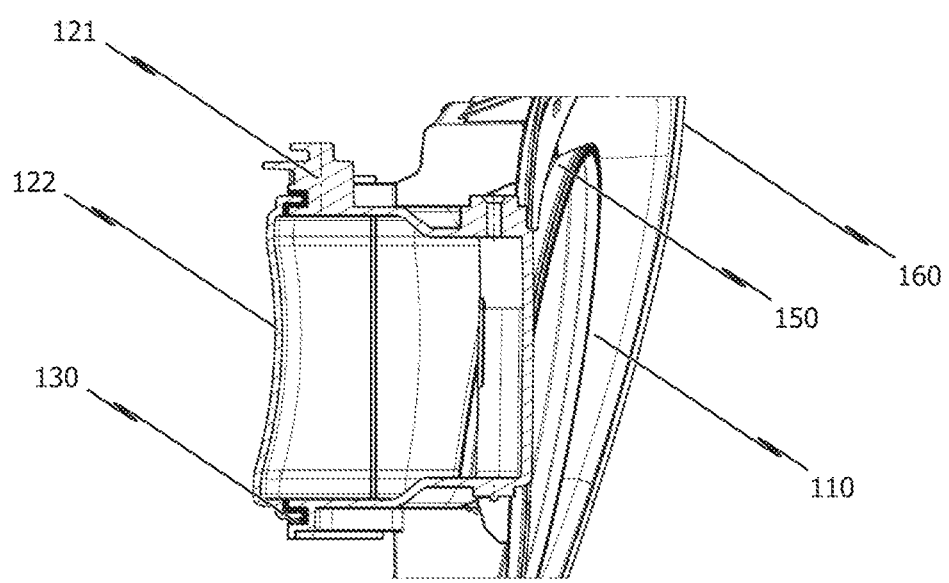
FIG. 8 shows a cross-sectional view along the line D-D in FIG. 6.

As can be seen in particular in FIG. 7 and FIG. 8, and outer edge of the hinge housing 120 is over-molded by means of a hinge housing sealing body 130. The hinge housing sealing body 130 herein is arranged on the transition between the upper part 122 and the lower part 121. The hinge housing sealing body 130 thus fulfils the sealing function thereof in that said hinge housing sealing body 130 (reliably) seals the hinge housing 120, thus the transition between the lower part 121 and the upper part 122.

In particular, the hinge housing sealing body 130 is formed so as to be circumferential on the transition between the lower part 121 and the upper part 122.

As can be seen in FIGS. 5 to 8, during the flexible part injection-molding step the upper part 120 of the hinge housing 120 is already located on the lower part 122. To this end, a transfer step in which at least the upper part 122 is placed onto the lower part 122 is used. Moreover, during the transfer step the rigid part can be placed into another cavity for the flexible part injection-molding step. By virtue of the integral hinge 123 shown in the figures, it is possible to simply turn the upper part 122 over the integral hinge 123.

Furthermore, a first sealing body 150 and a second sealing body 160 are also formed in the flexible part injection-molding step, wherein the first sealing body 150 is formed between the supporting member 170 and the recess body 110, thus sealing the interface between the recess body 110 and the supporting member 170, or between the tank filler pipe or the charging plug connector, respectively.

The second sealing body 160 is formed or molded, respectively, on an outer edge of the recess body 110 such that said second sealing body 160 seals the interface between the fueling or charging recess and the body opening.

The hinge housing sealing body 130, the first sealing body 150, and the second sealing body 160 are produced from the same second plastic which is softer than the first plastic, and are in particular formed during the same injection-molding step.

It is thus possible to produce the charging or fueling recess 100 in a two-component injection-molding process. The charging or fueling recess 100 can consequently be produced in a rapid and simple manner and in the installed state reliably fulfils the function thereof in that the interfaces between the individual components are reliably sealed.

LIST OF REFERENCE SIGNS

10 Through-opening
100 Charging or fueling recess
110 Recess body
120 Hinge housing
121 Lower part
122 Upper part
123 Integral hinge
130 Hinge housing sealing body
140 Web
150 First sealing body
160 Second sealing body
170 Supporting member

What is claimed is:

1. A charging or fueling recess for use in a body opening of a vehicle, comprising:
a recess body and a hinge housing as a rigid part made of a first plastic,
wherein the recess body is formed integrally with the hinge housing,
wherein the hinge housing has a lower part and an upper part,
wherein the charging or fueling recess also has a hinge housing sealing body as a flexible part made of a second plastic which is softer than the first plastic,
wherein the hinge housing sealing body is arranged at least sectionally for sealing between the lower part and the upper part, wherein the recess body, the hinge housing and the hinge housing sealing body are produced using a two-component injection-molding process;
wherein the lower part and the upper part of the hinge housing are connected on one side by an integral hinge;
wherein the lower part of the hinge housing is connected by a web to the recess body, the integral hinge being arranged on a side of the lower part opposite the web.

2. The charging or fueling recess as claimed in claim 1, wherein the charging or fueling recess also has a first sealing body which is arranged in a through-opening of the recess body and is made of the second plastic.

3. The charging or fueling recess as claimed in claim 1, wherein the charging or fueling recess also has a second sealing body which is arranged at least substantially on an outer edge of the recess body and is made of the second plastic.

4. The charging or fueling recess as claimed in claim 2, wherein the recess body, the hinge housing, the hinge housing sealing body and the first sealing body and/or the second sealing body are produced using the two-component injection-molding process.

5. The charging or fueling recess as claimed in claim 4, wherein the charging or fueling recess also has a supporting member which is arranged in the through-opening of the recess body and around which the first sealing body is injection-molded.

6. The charging or fueling recess as claimed in claim 1, wherein the charging or fueling recess also has a hinge arm connected pivotably to the hinge housing, said hinge arm being connected or connectable to a charging or fueling recess.

7. A charging or fueling recess for use in a body opening of a vehicle, comprising:
a recess body and a hinge housing as a rigid part made of a first plastic, wherein the recess body is formed integrally with the hinge housing,
wherein the hinge housing has a lower part and an upper part, wherein the lower part and the upper part of the hinge housing are connected on one side by an integral hinge that allows the upper part to close onto the lower part,
wherein the charging or fueling recess also has a hinge housing sealing body as a flexible part made of a second plastic which is softer than the first plastic,
wherein the hinge housing sealing body is arranged at least sectionally between an edge of the lower part and an edge of the upper part when the upper part is closed onto the lower part for sealing between the edge of the lower part and the edge of the upper part, wherein the recess body, the hinge housing and the hinge housing sealing body are molded together as a unit.

8. A charging or fueling recess for use in a body opening of a vehicle, comprising:
a recess body and a hinge housing as a rigid part made of a first plastic, wherein the recess body is formed integrally with the hinge housing,
wherein the hinge housing has a lower part and an upper part,
wherein the charging or fueling recess also has a hinge housing sealing body as a flexible part made of a second plastic which is softer than the first plastic,
wherein the hinge housing sealing body is arranged at least sectionally for sealing between the lower part and the upper part, wherein the recess body, the hinge housing and the hinge housing sealing body are molded together as a unit;
wherein the lower part and the upper part of the hinge housing are connected on one side by an integral hinge;
wherein the charging or fueling recess also has a first sealing body which is arranged in a through-opening of the recess body and is made of the second plastic.

* * * * *